UNITED STATES PATENT OFFICE.

TEOFRON BOBERG, OLOF SÖDERLUND, AND FELIX ÅSLUND, OF LONDON, ENGLAND, ASSIGNORS TO TECHNO-CHEMICAL LABORATORIES LIMITED, OF LONDON, ENGLAND.

CONCENTRATED FOOD PRODUCT AND THE LIKE.

1,240,020.  Specification of Letters Patent.  Patented Sept. 11, 1917.

No Drawing.    Application filed June 10, 1915.  Serial No. 33,416.

*To all whom it may concern:*

Be it known that we, TEOFRON BOBERG, OLOF SÖDERLUND, and FELIX ÅSLUND, subjects of the King of Sweden, and all residing at Fairlawn, Clarence Road, Clapham Park, London, England, have invented certain new and useful Improvements Relating to Concentrated Food Products and the like, of which the following is a specification.

This invention relates to the preparation of desiccated food products such as meat extracts, coffee extracts, and the like, in a consolidated but porous form.

As hitherto prepared such products in tabloid form are not very quickly soluble. They are moreover as a rule sufficiently fragile to necessitate care in handling and on crumbling form a hygroscopic powder; while if a certain amount of moisture is retained in the product to assist binding, the keeping qualities of the material are seriously impaired.

The object of the present invention is to render it possible to obtain consolidated products which are free of these disadvantages.

According to the present invention the food product is dried until its water content is comparatively low, say 5 to 10% by weight, the material then roughly consolidated, and the resulting masses heated until fusion or melting of their outer surfaces just commences, whereupon the remaining moisture is suddenly evaporated by a reduction of the superincumbent pressure, whereby the masses are caused to swell, and form a hard but porous product on cooling.

In carrying the invention into effect, meat or coffee extract in the liquid state is desiccated and powdered to produce a material having a moisture content of about 9% in the case of meat extract and 5 to 10% in the case of coffee extract, the material if too dry being moistened by exposure to damp air or by admixture with a suitable quantity of moister material. The powder is then thoroughly mixed to insure homogeneity and consolidated in a manner depending upon the final form of product desired. Thus, to obtain an eventual product in the form of grains or seed the mass is consolidated between rollers capable of exerting pressure and is afterward broken up into small fragments which are sorted out by means of a screen or sieve. On the other hand where larger individual masses are desired in the final product the material is converted into tabloids, pillules, and the like.

In either event the material in the form of small individual masses is introduced into a rotary heater adapted to tumble the material over repeatedly while raising its temperature to about 90° C. or a temperature just sufficient to set up fusion of the masses, whereupon the latter are subjected to a reduced pressure as by opening a valve which places the interior of the heater in communication with an evacuated vessel or one at a lower pressure. The reduced pressure is maintained until the product is completely dried which may in some cases take about sixty minutes where the material is in small masses about the size of a linseed.

As a result of the rapid evaporation of the remaining moisture in the partially fused material, the individual masses thereof swell up, and on being cooled set to form hard, smooth faced masses of more or less regular form and of a porosity which renders them readily soluble in water.

Having now described our invention what we claim as new and desire to secure by Letters Patent is:—

1. A method of increasing the porosity of substances by sudden expansion of a permeating fluid consisting in reducing a meat or coffee extract to a substance containing 5% to 10% of moisture, granulating said substance, forming a semi-impervious coating on said granules by heating to some 90° C. while being continually tumbled over and suddenly reducing the pressure surrounding said granules.

2. A method of preparing concentrated food and like products consisting in reducing the moisture content of the material to about 5% to 10% by weight, roughly consolidating the material into small masses, heating said masses to a temperature of about 90° C., suddenly reducing the superincumbent pressure during such heating until the remaining moisture is evaporated and then cooling the resulting product.

In testimony whereof we have signed our names to this specification.

TEOFRON BOBERG.
OLOF SÖDERLUND.
FELIX ÅSLUND.